United States Patent [19]

Bogner

[11] 4,354,543
[45] Oct. 19, 1982

[54] PORTABLE HAMPER

[76] Inventor: Paul Bogner, 1585 Sunflower Ave., Costa Mesa, Calif. 92626

[21] Appl. No.: 205,372

[22] Filed: Nov. 10, 1980

[51] Int. Cl.³ .............................................. B65D 30/00
[52] U.S. Cl. ...................................... 150/50; 248/98; 248/147
[58] Field of Search ..................... 150/48, 49, 50, 51; 248/97, 98, 99, 100, 101, 147

[56] References Cited

U.S. PATENT DOCUMENTS

| | | | |
|---|---|---|---|
| 3,603,367 | 9/1971 | Lehrman | 150/49 |
| 3,659,816 | 5/1972 | Wilson | 248/97 |
| 3,893,648 | 7/1975 | Gilbert | 248/97 |
| 4,180,113 | 12/1979 | Liebling | 150/51 X |
| 4,281,814 | 8/1981 | Verwey | 248/97 |

Primary Examiner—Donald F. Norton
Attorney, Agent, or Firm—Grover A. Frater

[57] ABSTRACT

A hamper has a frame and cover arrangement which permits automatic cover closure or non-closure as the hamper is loaded.

19 Claims, 9 Drawing Figures

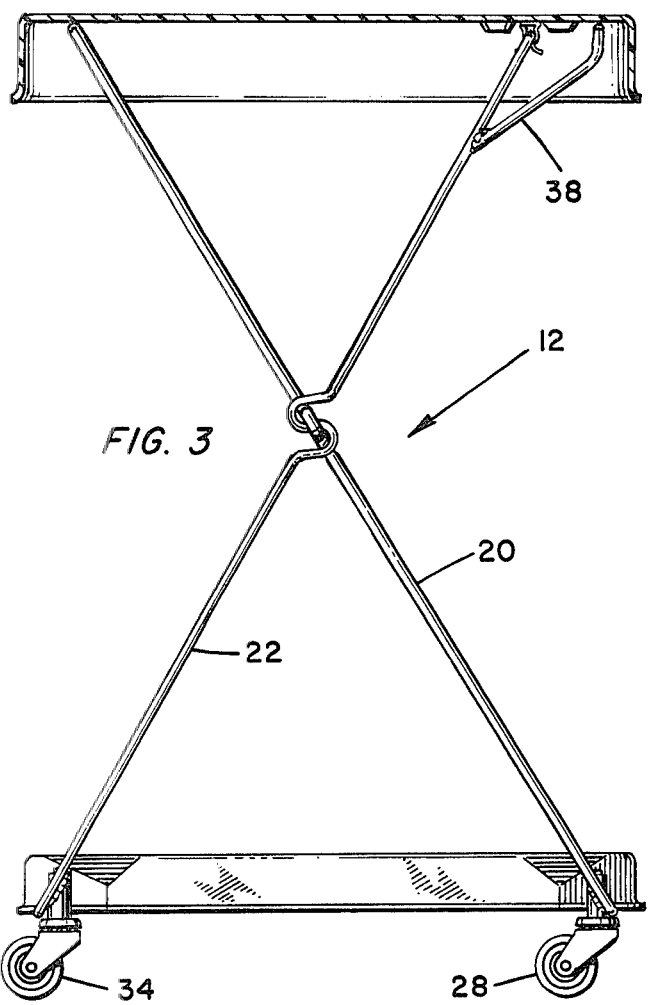
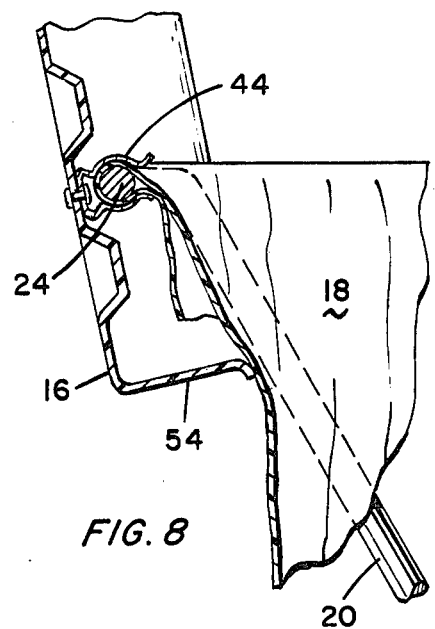
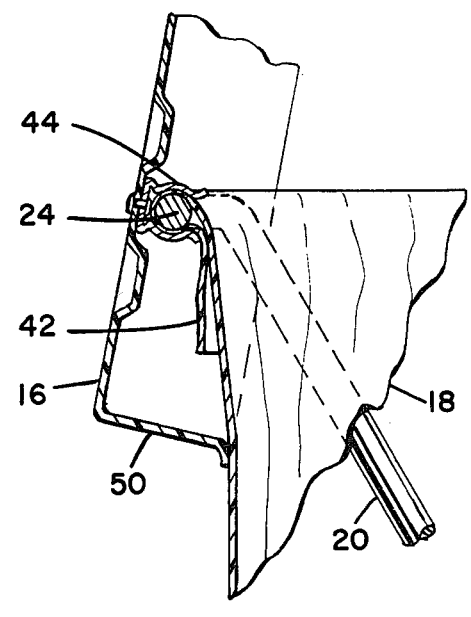
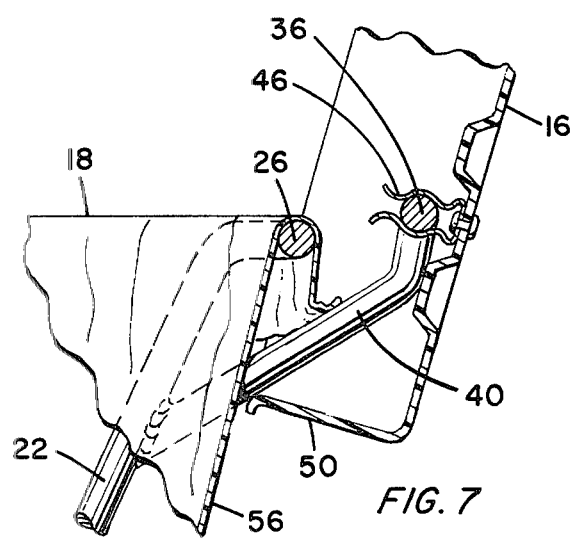
FIG. 3
FIG. 8
FIG. 9
FIG. 7

PORTABLE HAMPER

TECHNICAL FIELD

This invention relates to improvements in hampers, and it relates in particular to hampers of the kind that comprise a frame on which a pliant bag is suspended.

BACKGROUND OF THE INVENTION

While the invention has broader utility, one of its objects is to provide a better hamper for use in hospitals and nursing homes than any hamper previously devised. Hampers for that application must be portable, easy to keep clean, easy to store, inexpensive to produce and to use, and they must be capable of being applied to different procedures each appropriate to the storing, movement and disposition of a different class of material. Some of those requirements have been met, in varying degree, by the development of portable folding hamper frames to which a removable bag is attached. The original cloth bags have been replaced by disposable plastic bags.

Those features, however, solve only part of the problems for which hampers can provide solutions, and they perform only part of the functions which hampers can provide. Soiled linen, trash, infectious linen, infectious surgical supplies, bio-hazardous waste, diapers, and other materials must be collected, transported and processed differently. Collection procedures and processing vary greatly. In some cases, it is desired to have the hamper covered; in other cases, not. The hampers in which infectious and hazardous materials are collected should, and ordinarily must, be covered at all times. The trash collection hamper, on the other hand, may need to be covered in some circumstances and uncovered in others. The hamper in which fresh linen is distributed is ordinarily uncovered. The universal hamper would have a cover that provides an easy choice between cover or no cover, and cover closed or open.

Each task tends to present different requirements to the hamper designer. In collection applications, the bag is empty when affixed to the hamper so that it makes little difference whether the bag is assembled from above or below the frame. On the other hand, in distribution applications, the hamper should be designed so that the bag can be attached to the hamper from below with little or no lifting. So, too, in the case of a collection task in which the load will be more than some minimum weight. If a hamper frame is to be universal, so that the number of frames may be minimized, it should be arranged such that the bag may be assembled with the frame from above or from below, and removal from below should be an easy and convenient task.

The list for requirements goes one. Most are not difficult to meet, except that many tend to be contradictory, particularly the requirement for minimum cost. Initial cost is significant, but the cost of utilization is much more important. Hampers are used, and filled and moved, not only by the maintenance staffs and the housekeeping staffs of hospitals. They are used extensively by nurses and physicians in the new-born nursery, the delivery room, the operating room, and in the geriatric's and children's wards. In those areas, to have a hamper that does not need to be attended to, but which, instead, serves as an easily used, convenient tool, is particularly important.

The hamper is an appliance that is moved up and down its hallways and through the hospital all day long. It is not very romantic, and has suffered in the past from minimum engineering and innovative effort. The invention has corrected that situation in recognition of the axiom that a hospital cannot run more smoothly than its hampers.

SUMMARY OF THE INVENTION

The invention utilizes a simple collapsible frame, preferably one formed by two X-shaped sides the corresponding ends of which are interconnected by upper and lower cross-members. Each of the X-shaped sides is formed by two crossed members which are pivotally interconnected at the crossing point such that the frame is collapsed in a scissor action. Such a frame may be formed by two rectangularly shaped frames, one less wide than the other such that the one fits within the width of the other. The two rectangular frames are interconnected only in the mid-region of their two sides. The interconnections are pivotal and are arranged to permit folding closed by a scissor action so that the two rectangular frames lie in parallel, or almost parallel, planes. They may be scissored open in a limited degree against a stop. Casters are fixed to the ends of the lower member of each rectangular frame.

In the invention the rectangular frame sections are held scissored open by a lower tray which is easily removable and is shaped to serve as a retainer for the hamper bag. It is a feature that conformations in the tray serve to retain spare bags. The upper cross members of the two rectangular frames serve as the supports on which the hamper bag is hung. The bag extends, open top up, between the X-shaped sides of the frame. The upper edge of the bag is folded over the two upper cross members and then down to surround the sides. The bag extends, or will extend when loaded, down such that its lower end rests on the tray.

A cover large enough to cover the open bag has side walls that fit down around the upper end of the bag and the two upper cross members. At its under surface it is fitted with fasteners, preferably in the form of spring biased clips which can be snapped onto one cross member of the frame and the portion of the hamper bag that is suspended from the cross member. The clips serve as a pivotal connection between cover and frame. They are located on the cover, and the sides of the cover are sufficiently deep so that an edge of the cover is engaged by the sides of the rectangular frame member on which the cover is pivoted as a stop. The cover is engaged when its center of gravity lies on the outer side of the cross member on which it is pivoted whereby, once open and tilted back, it remains open.

When the bag is empty and its sides are limp it offers no resistance to tilting the cover to open position. However, the point of engagement of the cover edge with the sides of the frame lies below the cross members and inwardly to a plane between the cross members. When the bag is loaded its side walls become taut. The bag is pulled taut against the lower edge of the cover wall. As a result the cover is forced to rotate about the cross member until its center of gravity has moved over center. Thereupon the cover is closed by its own weight. The degree in which the bag must be filled before it is pulled taut to close the cover depends largely upon how much of the bag extends below the cross frame. That degree is easily controlled when the bag is assembled on the frame. In practice, hamper users learn rapidly how to assemble the bag so that the cover will close at the desired degree of bag loading or so that it will automatically close at every addition to the bag and will remain open until the next addition if reopened.

Attachment of the cover and its removal are easily accomplished. After the bag has been placed on the frame, the cover is simply placed over the frame with the fastening clips resting on one of the cross members. It is then pushed downwardly and the fasteners snap into place. To remove the cover it is opened until the edge of the cover wall engages the side members of the frame. Further rotation of the cover pulls the fasteners from the cross member to separate it from the frame. The cover, and the tray, are made of a bendable plastic material in the preferred form, and are disposed of if soiled or after a use in which they may have become contaminated with a harmful material.

To create a hamper whose cover will not close when the hamper bag is loaded, a third cross member, or its equivalent, is fixed to the upper end of one of the rectangular frames at the side of the cross member of that frame away from the cross member of the other rectangular frame. The third cross member is located outside the other two whereby hamper bags may be attached to and removed from the frame without removing the cover which is clipped to the third cross member by the fasteners that were described above.

The third cross member is attached to the rectangular frame with which it is associated such that the cover side engages the attachment elements or other stop when pivoted open. As before, the stop is arranged such that the center of gravity of the cover lies outside the pivot axis when the cover is open.

The hamper being provided with a third crossbar, the cover can be arranged to remain open as the hamper is filled by clipping the cover to the third crossbar. It can be arranged for automatic closing by clipping the cover to the crossbar at the side opposite the side that carries the third crossbar.

The construction provided by the invention provides the advantages of universality, light weight, selective cover positioning, portability, and ease of use, and the other advantages mentioned above. The fact that easily removable covers may be used makes it practical to employ color coding to define the use to which a hamper is to be put. Only a separate cover, and not a second hamper frame, is required when one hamper class task is completed and another is to begin.

THE DRAWINGS

In the drawings:

FIG. 3 is a view in side elevation of the frame of FIG. 2 assembled with the lower tray and the upper cover, the latter being shown in central longitudinal section;

FIG. 7 is a cross-sectional view of a fragment of the hamper of FIG. 1 illustrating how the several parts are related when the cover is open; and FIGS. 8 and 9 are cross-sectional views of fragments of the hamper of FIG. 1 illustrating how the several parts are related when the open cover is attached to the opposite side of the hamper frame and the hamper is empty and full, respectively.

DETAILED DESCRIPTION OF THE INVENTION

Figure 1:
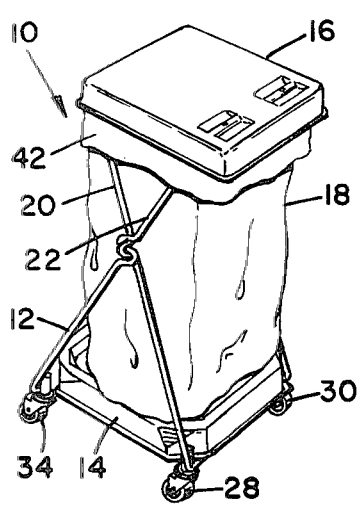
FIG. 1 is an isometric view of a hamper in which the preferred form of the invention is embodied.
Figure 2:
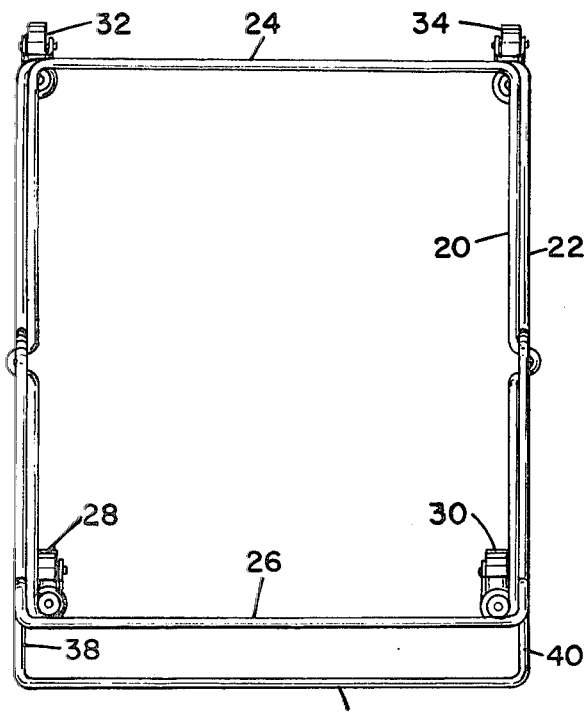
FIG. 2 is a top plan view of the frame of the hamper of FIG. 1.

The hamper 10 of FIG. 1 includes a frame 12, a lower tray 14, a cover 16, and a bag 18 which is assembled or mounted on the frame 12. The frame is seen from the top in FIG. 2, and from the side in FIG. 3. In both of those views the tray, the cover and the bag have been omitted. The frame shown is preferred because it is lightweight, easily collapsible, relatively inexpensive to produce and easy to keep clean. The complete frame comprises two sub-frames each formed of bar material which is bent into substantially rectangular shape. The rectangular sub-frame 20 is a little less wide than the sub-frame 22. The two sub-frames are interconnected at two points. Each sub-frame has a conformation formed in the mid region of both of its side members. The conformation at each side member of the rectangular frame member 20 is U-shaped, and the conformation at each side of the rectangular frame unit 22 is S-shaped. At each side of the finished frame the S-shaped conformation is threaded through the U-shaped conformation to form a pivot by which the two rectangular sub-frames are pivotally interconnected. The connection is such that the two rectangular sub-frames can be pivoted one with respect to the other until the two sub-frames lie in substantially the same position with the side members of the rectangular frame member 20 lying within the side members of the rectangular frame 22. That feature will be apparent upon an examination of FIG. 2.

The conformations in the side members of the two rectangular frames permit only limited relative pivotal movement. The two conformations interfere to prevent further pivoting when they are pivoted to the position shown in FIG. 3. The side members at one side of the rectangular frame members are visible in FIG. 3 where they form an X-shape. When the frame is opened it can be considered to comprise two X-shaped sides the outer ends of which are interconnected by cross members. The upper cross members are visible in FIG. 2. The upper cross member of the rectangular frame 20 is numbered 24. The upper cross member of rectangular frame unit 22 is numbered 26. The lower cross member of rectangular unit 20 is not visible because it lies directly below the frame member 26. The lower cross member of rectangular frame unit 22 is not visible because it lies directly below the cross member 24.

The frame includes four caster wheels. Two of them are mounted at the opposite ends of the lower cross member of frame 20, and they are numbered 28 and 30, respectively. The other two caster wheels are mounted at the opposite ends of the lower cross member of frame 22. They are numbered 32 and 34, respectively. There is an additional cross member 36 associated with the upper portion of the rectangular frame unit 22. That cross member is visible in FIG. 2, and it is integrally formed with extensions that are bent downwardly and are fixed by any suitable means, as by welding, to the side members of rectangular frame unit 22. The extension 38 is shown in FIG. 3, and both extensions 38 and 40 are visible in FIG. 2. Those two extension members, 38 and 40, by which the bar 36 is fixed to the rectangular frame unit 22 serve as a stop to limit rotation of the cover 16 when it is mounted on cross member 36. That will be explained below, and it will also be explained that the upper portions of the side members of rectangular frame member 20 serve as a stop to limit cover rotation when the cover is pivotally mounted on the crossbar 24.

The cross members 24 and 26 operate as a pair. When the hamper is in use those two cross members are substantially horizontal and they lie in approximately the same plane. In this embodiment the upper ends of the side members of both rectangular sub-frames are bent in a direction that transposes the cross members 24 and 26 away from one another in small degree. That feature is shown in FIGS. 7, 8 and 9. The extensions 38 and 40 of cross member 36 are bent so that the cross member 36 is disposed substantially parallel to cross members 24 and 26 but lies in a plane slightly above. That feature is best shown in FIGS. 3 and 7.

The manner in which the bag is assembled on the frame is shown in FIG. 1. The bag extends down between the two X-shaped portions of the complete frame. It is suspended from the pair of cross members 24 and 26. The upper edge of the bag is drawn over those two cross members and down. In practice that downwardly extending portion of the bag need only be several inches wide, in the case of most bags, to insure that the bag will be retained on the frame even when the bag is fully loaded. That is true, in part, because the bag is sufficiently long so that its lower end engages and rests upon the tray 14. It is possible to assemble the bag on the frame by placing the bag open end up between the two X-shaped portions of the frame and then spreading the top open and forcing the upper margin over the pair of cross members 24 and 26 and then down sufficiently far to make it secure. Alternatively, the bag can be assembled on the frame by holding it above the frame with its open side down. The bag is placed over the frame, and in particular it is placed over the pair of cross members 24 and 26, so that it extends a few inches below those cross members, and then the remainder of the bag is pushed through the space between the pair of cross members so that the lower portion of the bag is reentrant in the upper marginal portion that surrounds the bag opening. When assembled in that fashion, the bag is effectively turned inside out. In most cases the bag will be one in which the bottom will reach and rest upon the tray 14. The bag may be removed from the frame either by lifting it up through the space between cross members 24 and 26 or by pulling the marginal portion of the bag, that portion which is designated 42 in FIG. 1, upwardly past the cross members 24 and 26. That marginal upper portion of the bag is then lowered down below the level of cross members 24 and 26 whereupon the bag can be removed by simply moving it to the side away from the frame.

In this preferred form of the invention, the frame is formed of a rod material that is circular in cross-section. At least it is preferred that the cross members 24 and 36 be formed of cylindrical rods so that they can receive spring clips which are mounted on the under side of the cover 16 and so that when clipped on the cross member 24 or cross member 36, they will serve to form a pivotal connection between the cover and the frame.

Figure 6:
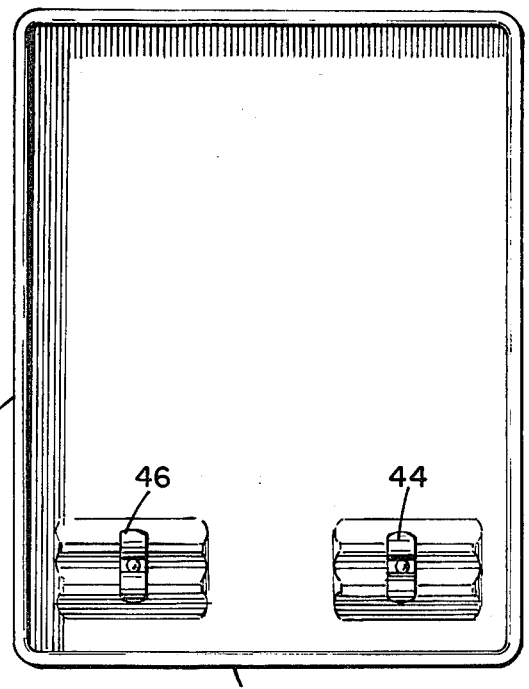
FIG. 6 is a bottom view of the cover of the hamper.

The invention envisions the use of a fastening means for interconnecting the cover and frame which will permit rotation of the cover from a closed position in which it covers one or both of the cross members 24, 26 and 36, and the bag that may be assembled upon them. The preferred form, and the form selected for illustration in the drawing, is a spring clip of the kind that is sometimes called a "fuse holder." Two of them are employed as best shown in FIG. 6. They are mounted on the under side of the cover and are numbered 44 and 46, respectively. The cover is recessed in the region at which the clips are attached to the cover to provide stiffening. The two clips are aligned. They need only be placed on the cross member to which they are to be attached, and the cover pushed down to assemble the cover on the frame. It will be apparent from FIGS. 1, 7, 8 and 9 that the cover is formed by a piece of relatively flat sheet material the margins of which join edges of a surrounding side wall. The width of the cover is such that it spans the width of the frame, from one X-shaped side structure to the other X-shaped side structure, with some, but not much, room to spare. In the other direction, the cover is sufficiently long so that it will cover all three of the cross members 24, 26 and 36, whether it be mounted on crossbar 36 or on cross member 24. If the clips 44 and 46 are mounted on crossbar 24, after a bag has been mounted on the frame, then the clips will serve to clamp the upper end of the bag to the frame cross member. If the clips are assembled on crossbar 36, then the clips would not clamp the bag to the frame because, ordinarily, the bag is stretched over the cross members 24 and 26 and is not stretched over cross member 36. Thus, the cover is mounted on cross member 36 if it is desired to assemble the bag on the frame and to remove it without need to remove the cover. The cover is attached to cross member 24 if the bag is to be assembled on the frame, or removed from it, with the cover off. If it is desired to use the clips to help hold the bag in place, as when a short bag is used or the bag is to be loaded with something that is both large and heavy, the cover would ordinarily be clipped over the bag and the cross member 24. It is possible to stretch the bag over cross member 36 as well, and if that is done, then the clips can be used to help the cover hold the bag in place whether the cover be attached to cross member 24 or 36.

If the cover is to be closed automatically each time more material is added to the bag, or when the bag is nearly filled, then the cover would be attached to cross member 24. If, on the other hand, the cover is to remain open while the bag is filled, it would be attached instead to cross member 36. When the bag is filled with septic or other material which is not to be exposed, the cover is attached to cross member 26 as shown in FIG. 3. In that position, the cover cannot be opened unless it is removed entirely.

Returning to FIG. 6, the clips 44 and 46 are shown to be mounted at some distance from the edge 50 of the cover. That feature is also shown in FIGS. 7, 8 and 9. In FIG. 7, the cover 16 is shown to be mounted upon the cross member 36. The bag 18 is mounted on the pair of cross members 24 and 26, and the cross member 26 is visible in the drawing. The cover 16 is clipped to the cross member 36 by the spring clip 46, and the cover is pivoted on the spring clip about the cross bar 36 to its open position. In this position the center of gravity of the cover lies outside cross member 36. That is, its center of gravity is on the side of cross member 36 away from the cross members 24 and 26. The extension 40 of the cross member 36 extends to a welded connection with one of the side members of the rectangular frame unit 22. The wall 50 of the cover engages the extension 40 at one side, and the extension 38 at the other side of the unit, so that the extensions serve as stops. The wall 56 of the bag 18 does not bear against the side wall 54 of the cover so no force is applied to the lower side of the cover, and there is no force that tends to close the cover. It will be apparent from the drawing that the bag wall will not engage the cover sufficiently to force cover closure, even when the bag walls are pulled taut by a load in the bag which tends to pull its side walls down.

If the cover clips are clipped instead on the cross member 24, in the manner illustrated in FIGS. 8 and 9, and if the bag is unloaded, as it is shown to be in FIG. 8, then the cover can be pivoted to the open position which it is shown to occupy. The edge of the cover is rotated sufficiently so that it engages the side member of the rectangular frame member 20. The side members serve as a stop to limit the degree in which the cover can be open when the cover is assembled on the crossbar 24, just as the side extensions 38 and 40 serve as a stop to limit the degree of cover opening when the cover is mounted on the crossbar 36.

FIG. 9 illustrates what happens when a load of material is added to the bag 18 such that the bag wall becomes taut and forces the lower portion of the cover wall away from the side portions of frame unit 20. In FIG. 9 the cover 16 has been forced to rotate around the pivotal connection between the clip 44 and the cross member 24 so that its center of gravity has moved from a vertical position outside of the cross members that hold the bag to a position between the cross members that hold the bag. Gravitational force will cause the cover to continue to rotate and automatically close. If the bag is assembled on the frame so that it does little more than touch the bottom tray, then the bag walls will be pulled taut each time an addition is made to the load in the bag, and the cover will close automatically each time that more material is added to the bag contents. On the other hand, if the bag is mounted on the frame so that a large portion of the lower end of the bag engages the lower tray 14, then the cover will not close until the bag is so full that its sides begin to bulge and are pulled taut, not by interaction between the load and the bag as the load enters, but instead is pulled taut as the load becomes sufficiently large so that it forces the bag to bulge outwardly and become taut.

The user can control the degree in which the cover closes automatically by the manner in which the bag is installed on the frame. More particularly, if the bag is installed so that the overlapping and surrounding portion of the bag, adjacent to its opening, is wide, then the cover can be expected to close with each addition to the load. On the other hand, if most of the bag is reentrant and the outer marginal section 42 is narrow, the bag will not close automatically until it is almost full. Experience has shown that not much practice is required to assemble the bag on the frame so that the desired result is achieved.

Figure 4:
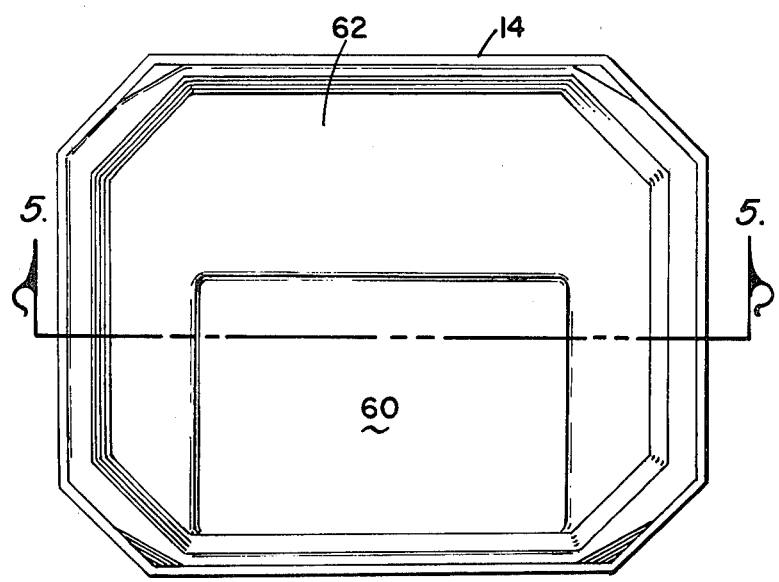
FIG. 4 is a top plan view of the tray of the hamper.
Figure 5:
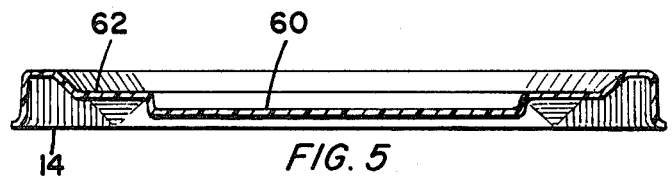
FIG. 5 is a cross-sectional view taken on line 5—5 of FIG. 4.

Returning to FIG. 1, the tray 14, like the cover 16, may be formed of a relatively inexpensive plastic material. Like the cover, its general shape is that of a shallow pan that has been inverted except, in this case, the corners are cut away to accommodate the lower ends of the X-shaped side members of the frame and the brackets for the several casters. The tray is sufficiently large so that it forces the two rectangular frame sections to be scissored apart as far as the U- and S-shaped hinges permit them to be spread. In the invention, the upper face of the tray is recessed, and the purpose is to insure that the load that is added to the bag tends to be urged toward a central position. The shape and extent of the recess is best shown in FIGS. 4 and 5. The preferred construction employs a recess within the recess. The inner recess is identified as that portion whose wall is designated 60. That recess extends below the larger recess which is identified by the numeral 62. The recess 60 aids in keeping the load centralized. However, it is located closer to one edge of the tray than to the other. That second recess, the one identified by the area 60, can be used to hold an additional bag which, when folded up, ordinarily extends no higher than the wall 62 at the level of the upper recess. The double recess arrangement insures that the primary function to be served by the recess is served, notwithstanding that a spare bag is carried for use in the event that a replacement bag is required.

While it is not particularly apparent, there is an interaction between the automatic cover closing action and the recess. Inclusion of the recess in the bottom tray makes it easier for the user to judge how the bag should be assembled on the frame to achieve automatic cover closing for each addition to the load, as distinguished automatic closing only when the bag is filled, and vice versa.

Although I have shown and described certain specific embodiments of my invention, I am fully aware that many modifications thereof are possible. My invention, therefore, is not to be restricted except insofar as is necessitated by the prior art.

I claim:

1. A material collection hamper comprising:
    a pliant bag having sides, a closed bottom and an upper portion surrounding an openable top;
    a frame comprising means for holding said upper portion of the bag with its top spread open and such that the remainder of the bag extends downwardly from said upper portion;
    a cover pivotally mounted on said frame such that in a first pivotal position the cover overlies the open top of said bag and such that in a second pivotal position the cover is removed from the region overlying said bag;
    said cover including stop means for engaging said frame as a stop when the cover occupies said second pivotal position and having a center of gravity such that said cover is urged downwardly over said bag opening when in said first position and such that said means is urged against said frame when in said second position;
    said cover further comprising cover closure means normally engaging a side of said bag when the cover is in said second position for urging said cover to pivotal movement from second to first position as an incident to the side of the bag being stretched taut by the placement of material into the bag.

2. The invention defined in claim 1 in which said cover is formed with a top portion surrounded by a downwardly extending encompassing side wall;
    said side wall serving as said cover closure means.

3. The invention defined in claim 1 which further comprises a lower support carried by said frame and disposed such that the bottom end of said bag engages said lower support.

4. The invention defined in claim 3 in which said bag is generally tubular in shape when assembled on said frame and supported by said support.

5. The invention defined in claim 3 in which the central area of said support is effective to support material contained in said bag.

6. The invention defined in claim 5 in which said support has an upper surface lying in a plane substantially parallel to the upper portion of the bag at the margins of the bag opening.

7. The invention defined in claim 6 in which a central region of said support is depressed away from said plane in the direction away from said bag opening.

8. For use with a material collection hamper of the kind that has a frame to which the upper margins of a top opening bag may be attached such that the bag extends downwardly from the frame and which hamper includes a cover pivotally mounted on the frame such as to be moveable from an open position to a closed position overlying the frame, the method of insuring movement of the cover from open to closed position as an incident to placing materials into a bag which is so attached to said frame which method comprises:

attaching a bag to said frame such that a portion of said cover is engaged by the bag and such that the bag and the portion thereof which engages the cover is pulled sufficiently taut to force the cover to pivot toward closed position as an incident to a quantity of material being introduced into the bag while so attached.

9. The invention defined in claim 8 which includes the further step of supporting the bottom of the bag such that the tautness of the bag sides is reduced upon material deposited in the bag coming to rest at the bottom of the bag whereby the cover, after having been pivoted closed, can be manually moved to and remain in opened position.

10. The invention defined in claim 8 in which the step of supporting the bottom of the bag includes the step of supporting the bag bottom such that material in the bag is urged to a central position under the bag opening.

11. In combination:

a frame the upper portion of which includes a generally horizontal member supported at its ends by side members each extending downwardly and away from one side of the vertical plane containing said generally horizontal member;

a cover member having pivotal connection to said generally horizontal member and capable of pivotal movement about an axis parallel to said generally horizontal member;

said cover being capable of pivotal movement such that its center of gravity is moved from one side of said axis to the other side of said axis;

a closure means carried by said cover such that it is disposed below said generally horizontal member and between said side members, and said closure means having a portion extending to said one side of said vertical plane, for engaging a bag suspended from said support such as to be propelled away from the bag as an incident to the bag side being forced thereagainst and having the center of gravity of the cover moved to said one side of said vertical plane.

12. The invention defined in claim 11 in which said frame includes a means in the form of a support for supporting the closed end of a bag carried on said frame such that the bag sides, having been forced taut by material entering the bag, are permitted to relax upon said material reaching the bottom of the bag and being supported therewith by said support.

13. The invention defined in claim 12 in which said support includes means in the form of a central downwardly directed depression for urging a bag bottom and material contained in the bag to a position at a central region of said support and at said one side of said vertical plane.

14. In a hamper:

a frame comprising a pair of frame members spaced to permit mounting a pliant bag on the frame such that the marginal positions of the bag adjacent the bag opening are disposed outside of said pair of frame members and such that the remainder of the bag extends over and between said frame members reentrant in said marginal portions;

said frame including a third frame member disposed at one side of said pair of frame members; and a cover of size to overlie said pair of frame members and any bag assembled thereon and said third frame member;

said cover including fastening means for pivotal attachment of the cover to either of said third frame member and one of said pair of frame members such as to be pivotal from a position covering said pair of frame members, and any bag assembled thereon, to a position in which the space between said frame members, and any bag assembled thereon, is uncovered.

15. The invention defined in claim 14 in which said fastening means comprises means for attaching the cover to that one of said frame members which is disposed between the other frame members such that said cover may not be pivoted open.

16. The invention defined in claim 14 in which said fastening means is formed for pivotal attachment to said one of said pair of frame members whether a bag is assembled on said pair of frame members or not.

17. The invention defined in claim 16 in which said frame comprises a first and second stop means for limiting pivotal rotation of said cover to a position in which it remains open when pivotally attached to said one of said pair of frame members and to said third frame member, respectively;

one of said first and second stop means being effective to hold said cover, when the cover is opened, such that a lower portion of said cover lies in the space below and between said frame members;

the cover comprising means, in the form of said lower portion, for responding to disposition of material into a bag mounted on said pair of frame members to propel said cover to closed position.

18. A hamper frame comprising:

first and second spaced bars arranged for disposition in substantially the same horizontal plane such that a bag can be suspended between them;

a third bar disposed outside of the space between said first and second bars adjacent said second bar;

a first cover stop carried on said frame at a point to be engageable, at a point below said plane and said first and second bars, by a cover when pivotally mounted on said first bar when the cover is pivoted to cover open position; and a second cover stop carried by said frame at a point to be engageable at a point below the pivotal mounting by a cover when said cover is pivotally mounted on said third bar and is pivoted to cover open position;

said first and second stops being located in the space between and below said first and second bars.

19. The invention defined in claim 18 which further comprises said cover.

* * * * *